United States Patent [19]
Nagarajayya et al.

[11] Patent Number: 5,991,762
[45] Date of Patent: Nov. 23, 1999

[54] METHOD AND APPARATUS FOR CREATING A TABLE OBJECT CONSTRUCTED FROM REUSABLE COLUMN OBJECTS

[75] Inventors: Nagendra Nagarajayya, San Jose; Bangalore Madhuchandra, Milpitas, both of Calif.; Xavier de Saint Girons, Chambourcy; Vincent Vandenschrick, Antony, both of France; Thierry J. Lobel, St. Mande, France; Marc D. Moss, Fremont, Calif.; Fabrice Keller, Plaisir, France

[73] Assignee: Sun Microsystems, Inc., Mountain View, Calif.

[21] Appl. No.: 08/884,908

[22] Filed: Jun. 30, 1997

[51] Int. Cl.⁶ .................................................. G06F 9/00
[52] U.S. Cl. .......................................................... 707/100
[58] Field of Search .............................. 707/16, 100, 200, 707/1–206

[56] References Cited

U.S. PATENT DOCUMENTS

| | | | |
|---|---|---|---|
| 5,421,008 | 5/1995 | Banning et al. | 707/4 |
| 5,717,925 | 2/1998 | Harper et al. | 707/102 |
| 5,721,911 | 2/1998 | Ha et al. | 707/100 |

OTHER PUBLICATIONS

Flanagan, David, Java In A Nutshell, 2nd Edition, O'Reilly & Associates, Inc., Sebastapol, CA, no date.

Kadel, Rich, Generic Client–Server Classes, Aug. 15, 1996, Internet:javaworld.com/javaworld.

Cameron, Jamie, JFS, Internet:jcameron@letterboxl.com, no date.

*Primary Examiner*—Thomas G. Black
*Assistant Examiner*—John G. Mills, III
*Attorney, Agent, or Firm*—Beyer Weaver, LLP

[57] ABSTRACT

A method for creating a table object made up of one or more columns, where the table object can be used as a programming interface or wrapper for an underlying table component is described. The table is made up of one or more column objects that can be used in other tables with minor alterations. The column objects are created to hold data of one type. This type can be a basic data type or a specialized graphical user interface type, allowing for great flexibility in creating table data structures for holding data of a wide variety. The table object is used to facilitate the use of an underlying table component, which may contain its own search engine. The table object acts as a wrapper for the table component allowing the application developer to use columns from other tables for use with a particular underlying table component without having to recreate or rewrite computer code for that particular underlying table component.

11 Claims, 11 Drawing Sheets

METHOD AND APPARATUS FOR CREATING A TABLE OBJECT CONSTRUCTED FROM REUSABLE COLUMN OBJECTS

BACKGROUND OF THE INVENTION

The present invention relates generally to data structure software run on computers. More specifically, it relates to a method and apparatus for designing and creating reusable software components simplifying the use of third-party table data structures.

One of these third-party table data structures is the JCTable. The JCTable is a component which allows an application developer to place a grid or table-like data structure made up of columns of certain types in an application. One of the disadvantages of a JCTable is that an application developer must write a significant amount of computer code for each of the columns in a JCTable to make the table functional. An application developer may want a table or a grid in an application to hold and display information in a particular way that makes it easy for users to access and manipulate. For example, such a grid could be made up of several columns where each column contains one type of information such as customer name, product description, number of units, price, etc. and this grid can be one portion or component of a larger application. Of course there are many other uses for such a table in computer applications. The disadvantages of the JCTable is that the computer code written by the application developer must be rewritten for each new JCTable. Thus, for each table with an underlying JCTable, the application developer must create and set data types for each column one by one for each new table.

Therefore, it would be desirable to have a method and apparatus for creating wrappers that are essentially reusable and can be applied to one or more underlying tables. The application developer would only have to set certain aspects of the column objects. These aspects would be those specific values of certain properties, such as the label of a column, so as to customize the column object to this new context.

SUMMARY OF THE INVENTION

Accordingly, the present invention provides a method for creating a table object made up of one or more columns, where the table object can be used as a programming interface or wrapper for an underlying table component. In one embodiment, a method for creating a table made up of reusable columns and assigning each column in the table to a column position in the underlying table is disclosed. In this aspect of the invention, the system creates one or more columns where each column holds data of one type. The columns are added to a table object thereby creating a populated table object. The types of data that can be contained in a column include basic data types such as integer, float type, and character, and also include graphical user interface data types such as edit combo box, choice box, and push button box.

In one embodiment, the columns are assigned positions in the underlying table component through the use of an object table in which a row in the table consists of a column object reference, a column identifier, and a base table index thereby collectively identifying a column position in the underlying table component. In still another embodiment, a column or column object is made up of two sections: an extended section and a base section. The extended section contains properties and methods specific to the column and the context in which it is being used. The base section contains properties and methods common to other columns in the table.

BRIEF DESCRIPTION OF THE DRAWINGS

The invention, together with further objects and advantages thereof, may best be understood by reference of the following description taken in conjunction with the accompanying drawings in which.

DETAILED DESCRIPTION OF THE PREFERRED EMBODIMENTS

One way to overcome the disadvantage of the prior art is to create column classes that can be reused in different applications with only minor changes. A DB table is a collection of such reusable column objects. Using a DB table, the application developer only has to create column objects and the DB table will handle the association of this object with the JCTable. One aspect of the column object that may need to be changed is the parameters such as the label which, for example, can be "Product Name" or "User." These labels would most likely have to change for each new column object. Thus, if an application developer creates a column integer class, for a column, (a column that holds an integer value) this column integer class is available to the developer to use in one or more DB tables. Another example is an application developer creating a column class of a special type called column choice. This type of column requires a significant amount of programming by the developer. The developer would have to handle several special callbacks (i.e. a type of function) to create and manage this column class. However, in the present invention, the column object class takes on these responsibilities. This allows the developer to reuse the column choice column class in other DB tables without having to rewrite much of the computer code. Although values for the specific properties of the column objects would most likely have to be set when the column object is used in different DB tables, the developer does not have to rewrite code to recreate the particular column object. Thus, considering these aspects, the DB table behaves as a wrapper for an underlying table, such as a JCTable. As a wrapper, it simplifies the initial programming and subsequent maintenance of the underlying table allowing the application developer great flexibility in adding columns or making changes to columns in an underlying table.

Figure 1:
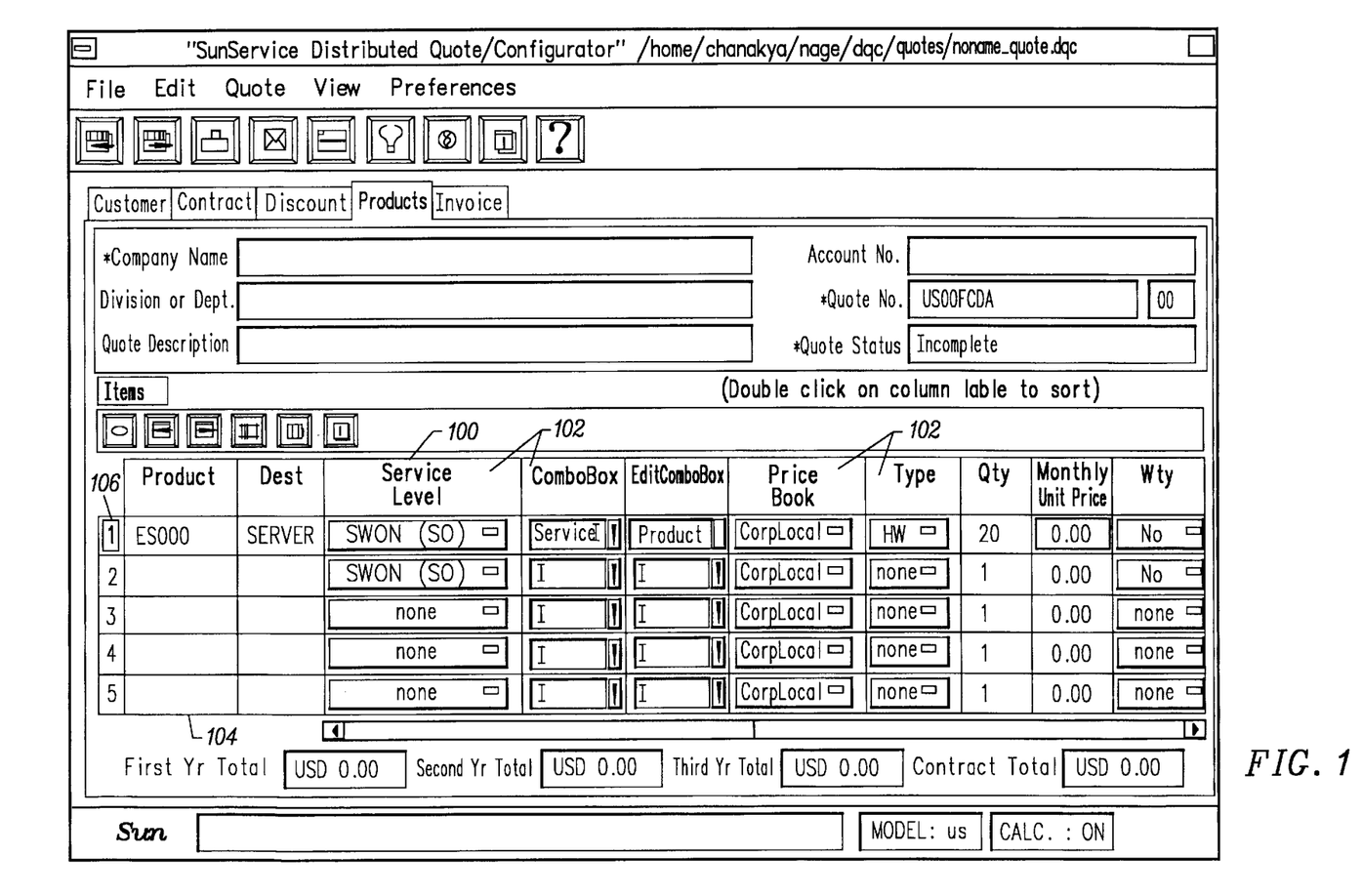
FIG. 1 is a screenshot of the "Sun Service Distributed/Configurator" computer application showing a DB table with various column types.

FIG. 1 is a screenshot of the "Sun Service Distributed/Configurator" computer application showing a DB table 100 with various column types 102. The screen shot of the application shown in FIG. 1 includes a toolbar or panel along the top of the screen showing various user functions and directly below the toolbar is an area for entering specific information for the application such as company name, account number, and department. Directly below this area is a smaller tool panel containing several icons and below this menu panel is the actual DB table 100.

The DB table shown in FIG. 1 includes five entries or rows 104 and shows ten columns (in the screen shot). The first entry or row has a unique index or ID 106 of one, which is highlighted or darkened and all the columns, such as Description, Product, and Service Level, have values in their cells for the first row. The DB table 100 in FIG. 1 shows examples of various types of column objects 102 including some basic types and some additional column types. It is useful to note here that an object is an instance of a class or, more informally, is derived from a class. Thus, a column object is derived from a column class. For example, a column object of type Column Choice is an instance (or derived) of the Column Choice class. When referring to a resuable "column object", it is the "column object" class that the application developer would resort to replicate functionality of the column object (with minor context-specific alterations). Returning to FIG. 1, the basic types include character string fields and are attributes of the Product, Description and Service Level columns. Other columns having basic data types are the Quantity and Monthly Unit Price field which contain integer or float values. Other columns such as Combo Box and Edit Combo Box are of additional column types that allow users to, for example, click on the cell and show other choices for the user and even allows the user to update or change the options available. Other columns such as Price Book and Type are also of additional data types and allow the user more flexibility with regard to choosing a particular function within that cell.

Figure 2A:
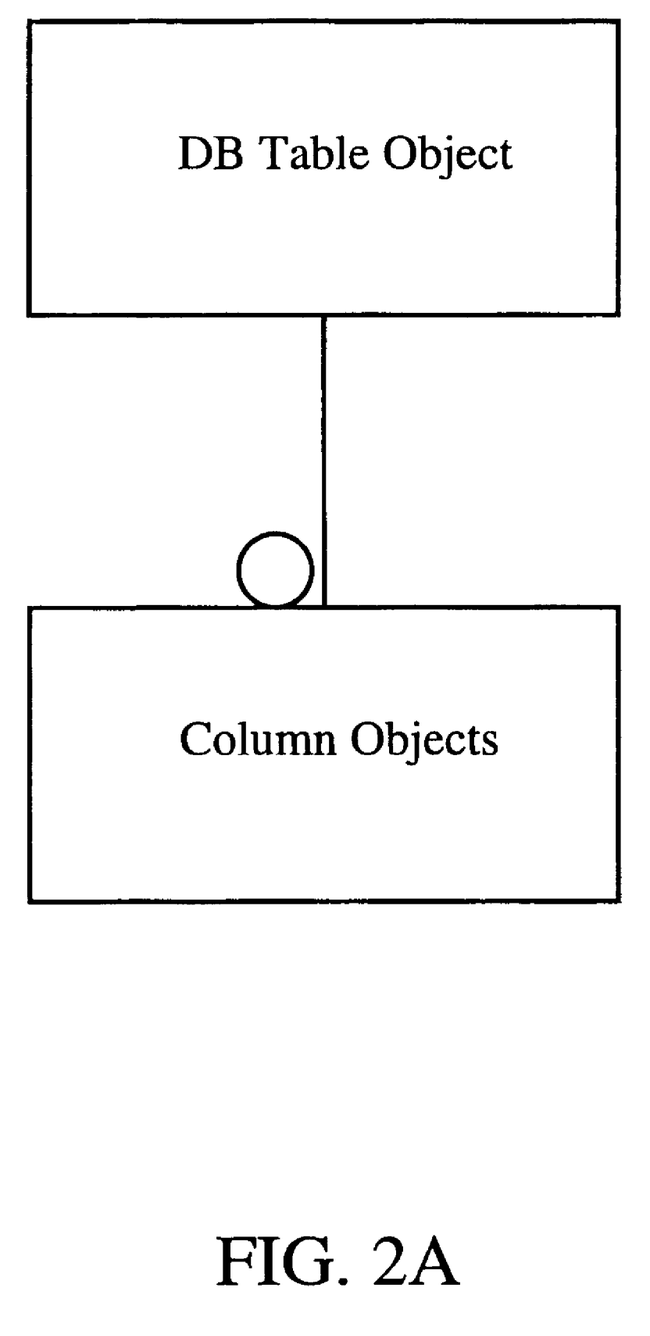
FIG. 2A is a schematic diagram of a DB table made up of a plurality of column objects.

FIG. 2A is a schematic diagram of a DB table made up of a plurality of column objects. The figure shows that a DB table, essentially a wrapper for an underlying JCTable component, is a set of one or more column objects.

Figure 2B:
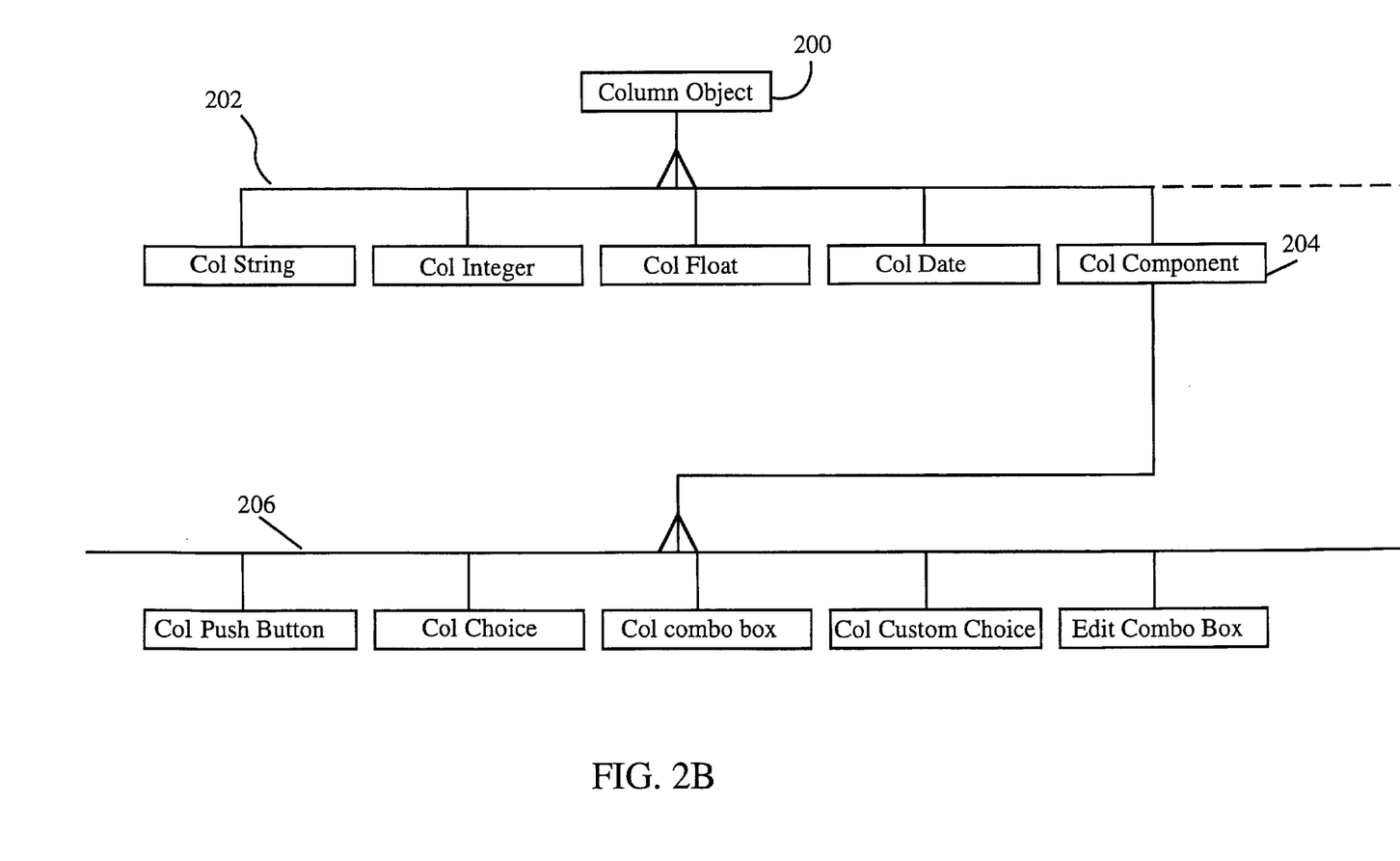
FIG. 2B is a schematic diagram showing the various data types of a column object.

FIG. 2B is a schematic diagram showing representative types a column object can have. At the top level, a column object can have a plurality of basic object types as shown on the first level of the structure. By way of example, these types may include: string, integer, float, date, component, etc. The column component data type in turn can have one of many different additional or derived data types. By way of example, as shown in the second level of the structure in FIG. 2B, a column component can take the form of column push button, column choice, column combo box, column custom choice, edit combo box, or any other type of component object, whether graphic or text-oriented. The type may even include another DB table. These additional object or data types allow the application developer great flexibility in choosing what type of data can be contained in a cell in a DB table and, thus, in a JCTable. It greatly expands on the typical data type or the basic data types as shown in the first level of the structure in FIG. 2B. For example, column pushbutton is a cell in a DB table where the user can move the cursor to the cell and click on that cell to show further options. The cell can contain an image or an icon or simply text. Another example is column custom choice which allows a user to invoke a pop-up window if clicked on providing further choices for the user. Edit combo box is an extension of column custom choice in which the user can edit the labels or options available in that cell. Column choice is a cell in a DB table that displays in its normal state to the user choices available regarding that cell. That is, the user can see all the choices or options available without having to click on the cell. A cell having a column combo box type is a combination of displaying choices to the user in its normal state but also having some of the choices available in greater detail through a pop-up window if the user wants more information on a particular option. These types are by way of example. The application developer can create cells of any type desired and create an appropriate interface for the user.

A basic data type as those shown in the first level of the tree structure in FIG. 2B is essentially any data type that is user defined. In the described embodiments, the data types in the second level of FIG. 2B, which are a sub-branch of the column component data type, are essentially graphical user interface components or, more specifically, JAVA components. These components are typically be painted or displayed on the screen.

Figure 3:
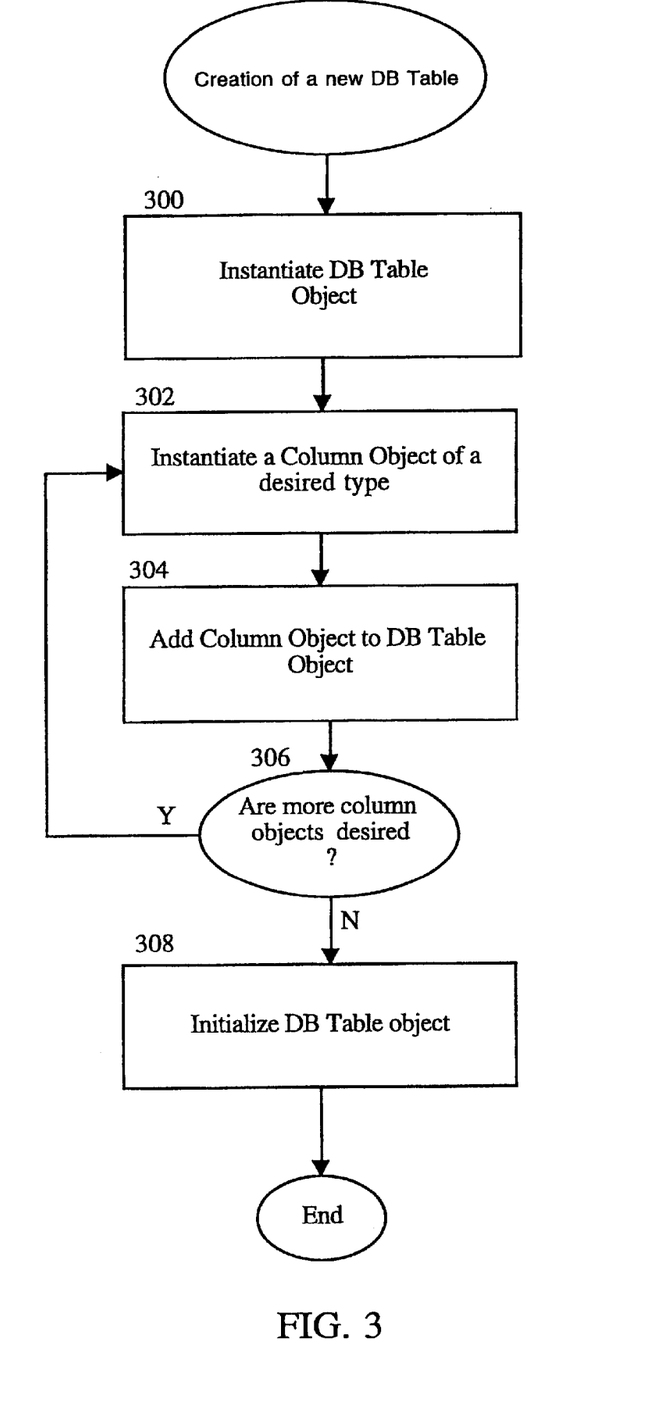
FIG. 3 is a flow diagram showing the steps for deriving a DB Table object of the present invention.

FIG. 3 is a flow diagram showing the steps of creating a new DB table in accordance with one embodiment of the present invention. A DB table is essentially an object of the DB table class and is made up of a plurality of column objects of selected types. In step 300 the system instantiates or creates a DB table object as either a read only table or a read write table. The DB table object is derived from the DB table class. In creating the DB table object, the only parameter, passed is whether the table will be read only or read/write. In the described embodiment the read/write mode is the default mode. Once the DB table object is created the system then creates one or more column object types in step 302. The column object types are selected from one of the available column object types. By way of example, the selected type may be one of the types shown in the diagram in FIG. 2B. All columns created for a DB table have a common set of properties regardless of whether the column object is of a basic type or an additional type. Step 302 is discussed in further detail below in the flowchart of FIG. 4.

Once the column object is instantiated from the column class, the system then adds the newly created column object to the DB table object in step 304. The bare column object is essentially an abstract object and cannot exist by itself. It only takes on meaning in a DB table when it is associated with particular type or property such as integer, float, or column string. These types or properties are shown in greater detail in FIG. 2B. The column object has a set of common properties which includes the following: data type, length, visibility, column number, parent object reference, old value, new value, traversable, and color attributes. The column object also has a set of common methods which include the following: set data, get data, initialize, create component, and display component. When creating a column object the programmer is required to pass few parameters. This is true because the class of the column object establishes many of the basic properties of the column object automatically. Thus, when creating a column object for the DB table, the application developer creates a specific basic or derived object of a selected type. The basic or derived objects will automatically have the properties of the column object class and will override any of these properties it is designed to do so by the application developer. When creating a column object of a selected type such as column string object there are two required parameters: a unique identification or key and a label (e.g. Product or Service Level). The other parameters are optional and are set according to the desired functionality of the DB table and of the specific column object (i.e., the overall functionality of the application). Column classes created in this manner are essentially reusable objects or modules that can be used in other applications.

In step 304 the system adds the newly created column object to the DB table. The system automatically invokes the correct methods for adding the column objects to the DB table. The DB table keeps track of the column objects that are created and added to its set of column objects and later maps the column objects to an underlying JCTable. In the event there is more than one JCTable involved in particular application, the DB table keeps track of which column object is to be mapped or applied to which JCTable. In step 306 the system determines whether the user wants to add more column objects to the DB table and, if so, returns to step 302 where a new column object is created. The system then continues with step 304 to add the new column objects to the DB table. If there are no more columns to be added to the DB table, the system goes to step 308 where the DB table object is initialized using an Init method of the DB table class. Step 308 is discussed in greater detail in FIG. 9. Once the DB table object is initialized, the process of creating a new DB table with an underlying JCTable is complete.

Figure 4:
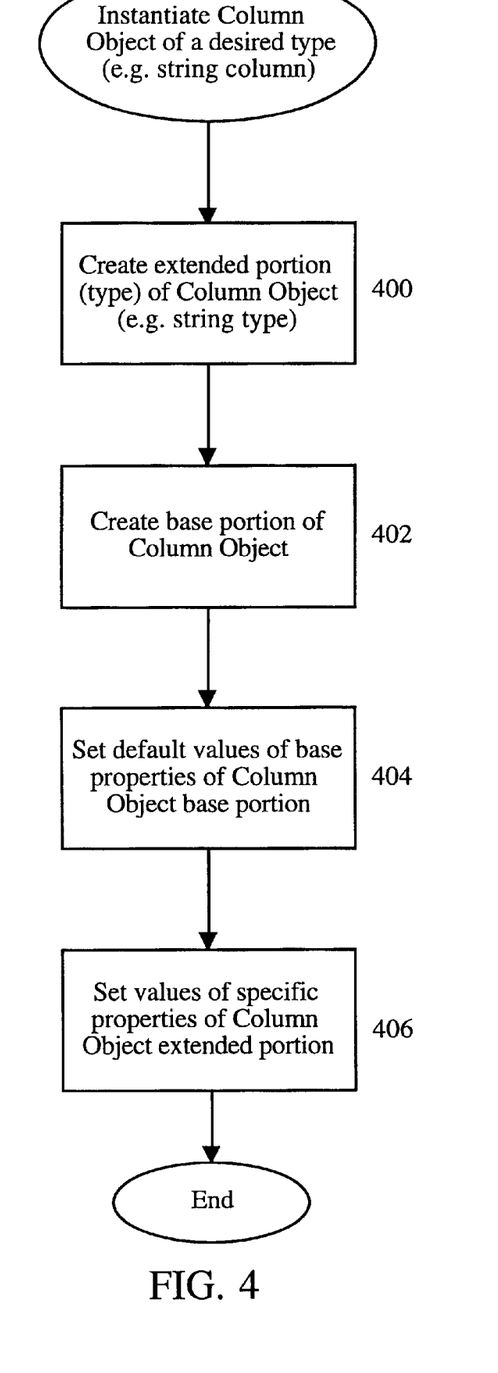
FIG. 4 is a flowchart showing in further detail step 302 of FIG. 3 describing the derivation of a column object of a selected type.

FIG. 4 is a flowchart showing in greater detail step 302 of FIG. 3 describing the creation of a column object of a desired type. FIG. 4 shows the steps of creating specifically a column string object ( derived from the column object class). In the described embodiment, when creating any type of column object, at least two parameters are passed: a unique (column) identification or key and a label such as "Product "or "Customer." Recall that the column object is an abstract object and cannot exist meaningfully by itself. Thus, in step 400 the system creates the extended portion of the column object, which in this case is the string object portion. Although the creation of the base column object and the extended object portion (e.g., string object) are described separately, they occur simultaneously. Thus, the column string object is created in one step. This would be the case for any type of column object whether it be float, integer, column component, or any of the other types shown in FIG. 2B. In step 402 the base portion of the column object is created or instantiated. In step 404, the common properties attributable to the base portion of the column object are set and other variables are initialized. These properties were listed earlier in the described embodiment as the common properties of the column object. They include: data type, length, visibility, column number, parent object reference, old value, new value, traversable, and color attributes. In step 406 specific properties of the extended column object that is being created are set according to the functionality required of the particular column object. Once the common and specific properties of the column object are set, the process of instantiating a column object for the DB table is complete.

Figure 5:
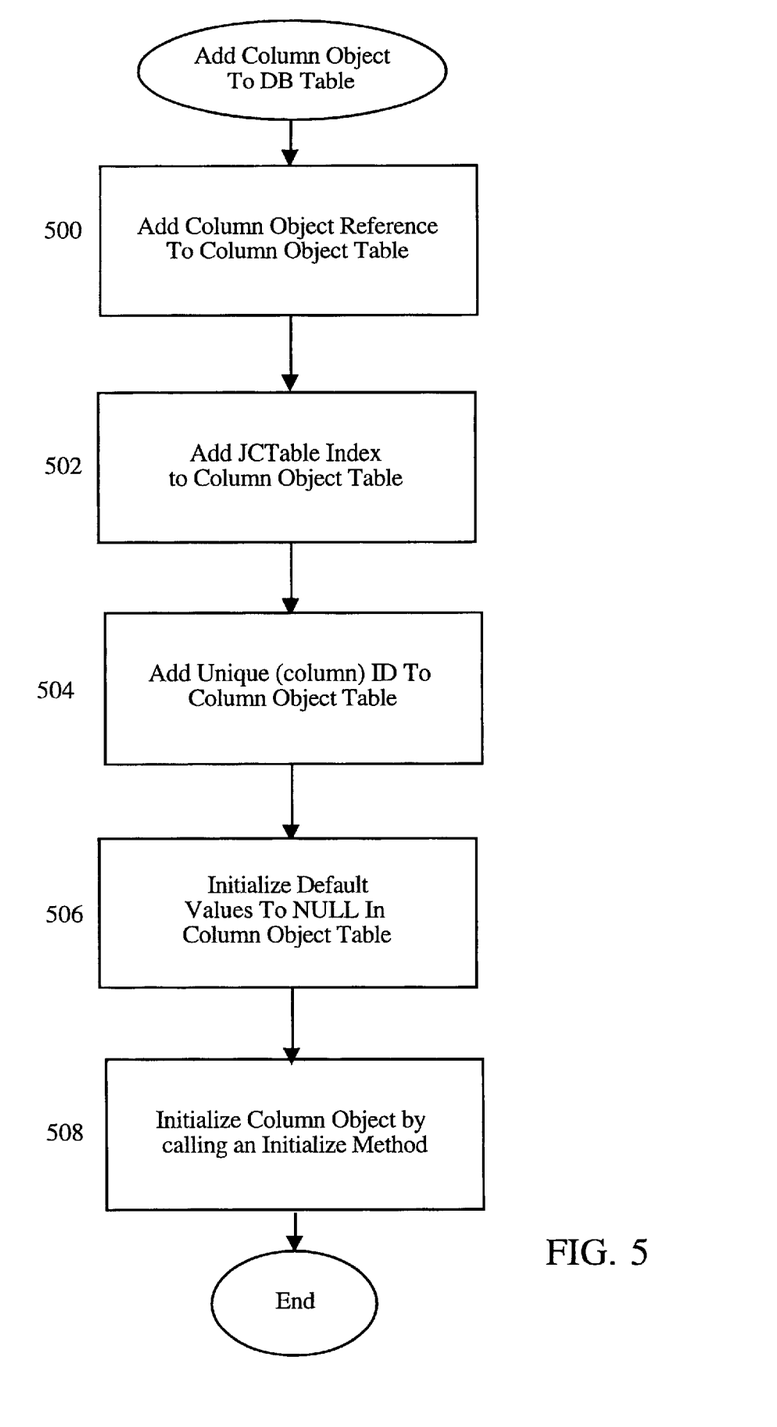
FIG. 5 is a flowchart showing in greater detail step 304 of FIG. 3 describing the steps of adding a column object to the DB table object.

FIG. 5 is a flowchart showing in greater detail step 304 of FIG. 3 describing the steps of adding a column object to the DB table. The DB table maintains a column object table that it uses to add column objects to the DB table and to match the column objects to the underlying JCTable. In step 500, a column object reference for the newly created column object is added to the column object table. The column object table is essentially made up of three columns: a column object reference, the unique (column) identification or key, and the JCTable index. The purpose behind the column object table is to find or look up an underlying index for the JCTable (i.e. JCTable index) given a column object reference or unique (column) ID. Thus, the column object reference or unique(column) ID can be used as keys to look up a JCTable index.

In step 502 the system adds the JCTable index to the column object table. In step 504 the system adds the unique (column) ID to the column object table. Thus, with steps 502 and 504 a new line is entered in the column object table. In step 506, the default values (derived from a default value list) for items in the column object table are initialized to NULL. Once the default values are set, the column object is added to the DB table. In step 508, the column object is initialized by calling an initialize or Init ( ) method of the column object class. The Init method is passed as a parameter, a JCTable index and a parent pointer. The column object initialization process is discussed in further detail in FIGS. 6, 7, and 8.

Figure 6:
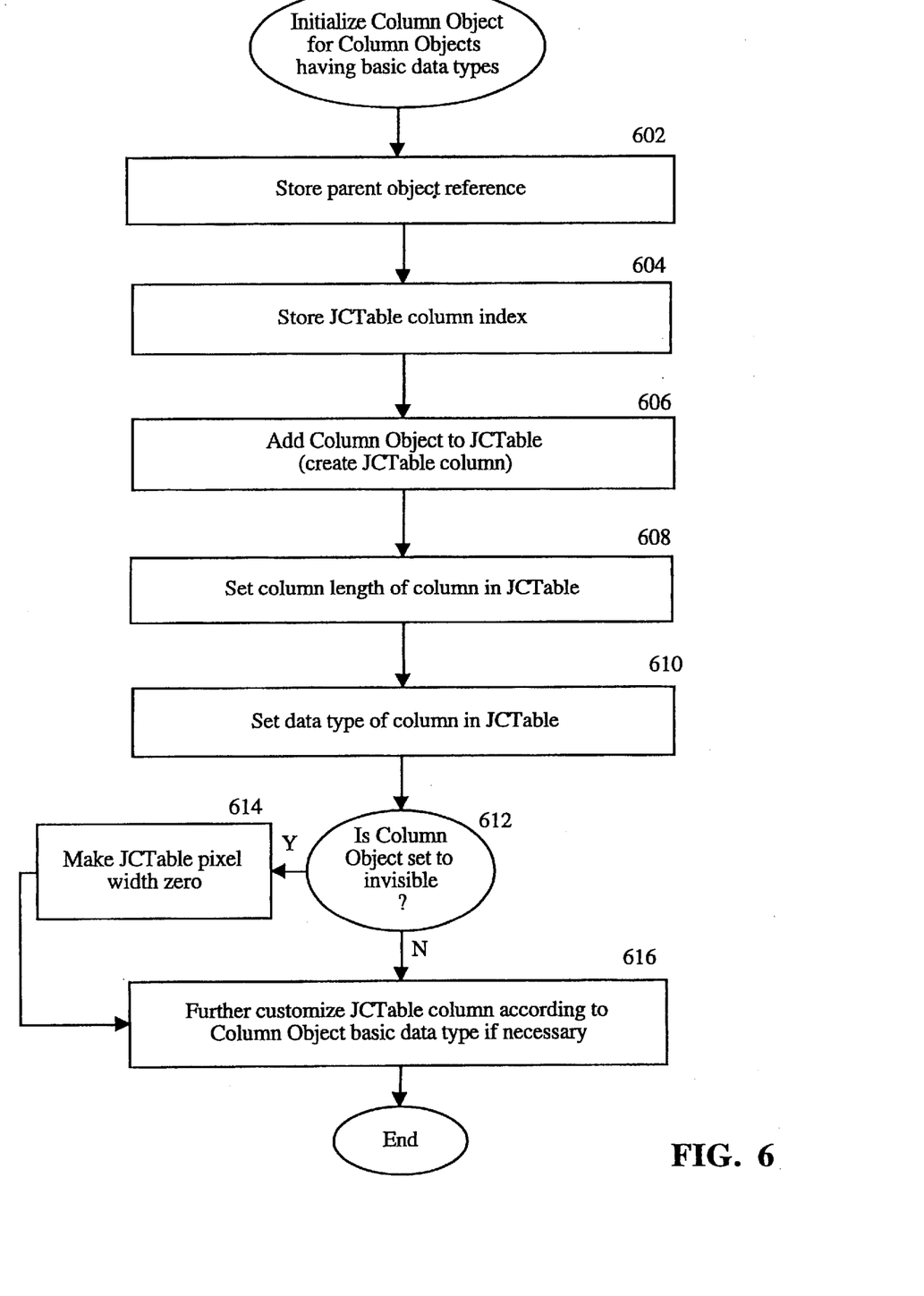
FIG. 6 is a flowchart showing in greater detail step 502 of FIG. 5 which describes the column object initialization process.

FIG. 6 is a flowchart showing in greater detail step 502 of FIG. 5 which describes the column object initialization process.. Generally, the initialization process for a column object is its incorporation into an underlying JCTable which is conducted by the column object. Essentially, the column object is mapped to a column in the JCTable. In step 602 the system stores a parent object reference (parent pointer) in the column object. In step 604, the system also stores the JCTable index in the column object. In step 606, the system adds a column to the underlying JCTable and in the process essentially creates the corresponding JCTable column. The parameters passed in adding the column to the JCTable are the JCTable index from the column object table discussed with regard to FIG. 5 and the label (for the column). At this stage, the DB table already knows where the column is going to be placed in the JCTable. In addition, all the default values are set to NULL Once the column for the JCTable has been created in step 606, the system customizes the column to hold the DB table column object, Thus, in step 608, the system sets a maximum column length for the column and, consequently, for the JCTable. In step 610, the system sets the data type of the underlying JCTable column. In the described embodiment, the data type of a column in the underlying JCTable is of a basic data type as shown in FIG. 2B such as a string, integer, float, date, or column component. Recall that one of the basic properties of the column object is visibility. In step 612, the system checks whether the column object is set to be invisible. If the column object is set to invisible, the system sets the JCTable column pixel width to zero in step 614. By making the pixel width of a column zero in the JCTable the user will not be able to view or see on the display monitor the specific column object that is being initialized in FIG. 6.

Figure 7:
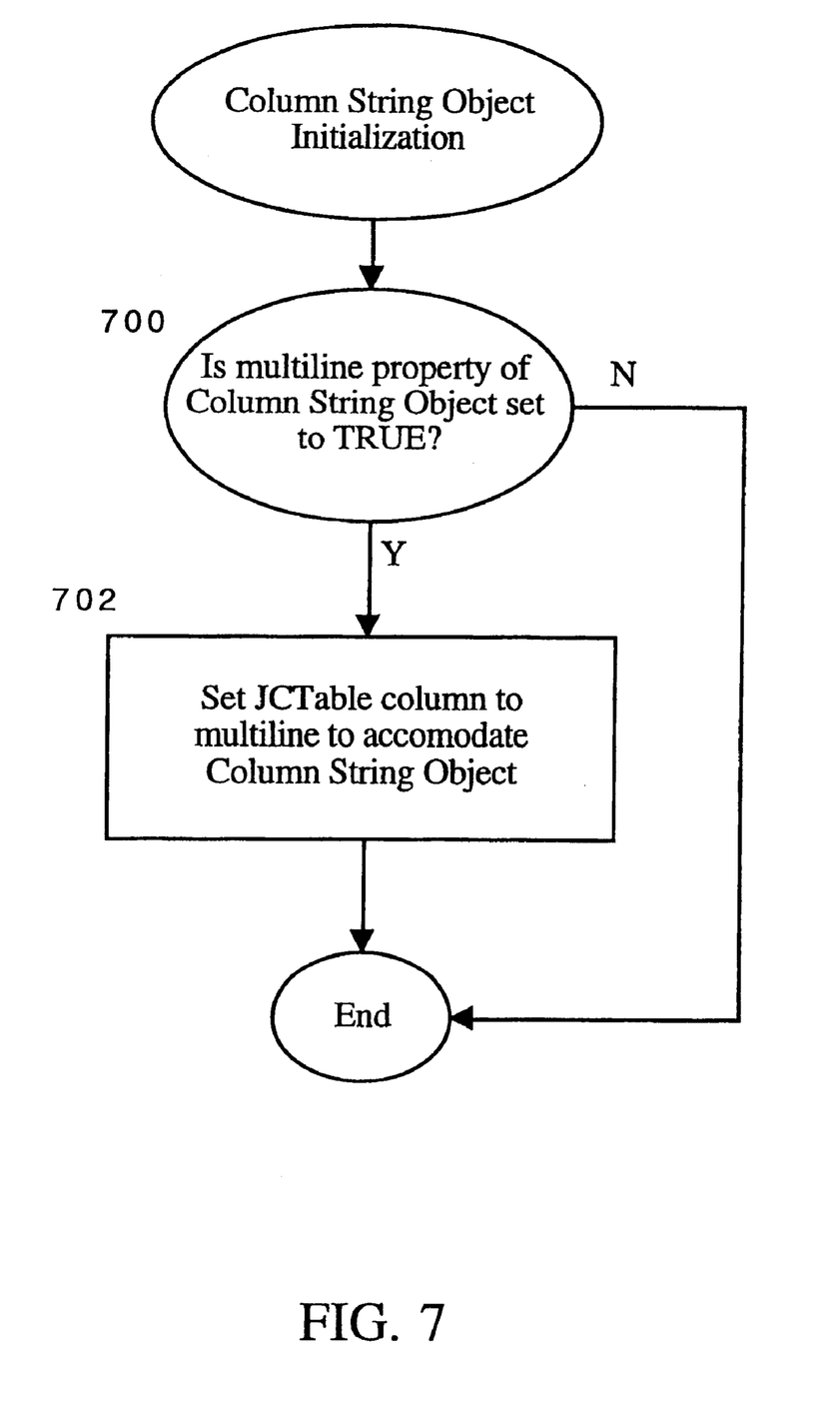
FIG. 7 is a flowchart showing in further detail step 616 of FIG. 6 describing the initialization process of a typical column object having a basic type.

In FIG. 6, all steps up to and including step 614 could be applied to any basic type of the column object. The initialization process for a column object having an additional type (i.e. a column component column object) is described in FIG. 8. In the described embodiment, after step 614, the initialize process is customized for a column object having an additional type. Stated another way with reference to FIG. 2B, steps after step 614 apply only to data types under column components. Returning to step 612, if the column object is not set to invisible, the system then continues customizing the JCTable column according to the basic data type of the column object if necessary. An example of further customization is shown in FIG. 7. in step 616. The steps in FIG. 6 for initializing a column object type are needed to set the properties of the JCTable column so that the column is displayed to a user according to a format set by the application developer.

FIG. 7 is a flowchart showing in further detail step 616 of FIG. 6 describing the initialization (or customization) process of a typical column object of a basic type. It shows the initialize method being called for a column string column object (a column object of a basic type). Thus, the steps in FIG. 7 will vary according to what type of column object is being initialized. For the column string object, the system determines whether the multiline property for the column string has been set in step 700. Quite simply, if the multiline property has been set, the system then sets the corresponding underlying JCTable column to have the multiline property or attribute in step 702. If the multiline property for the column string object is not set, the JCTable column is not altered in any way and the initialization process is complete.

Figure 8:
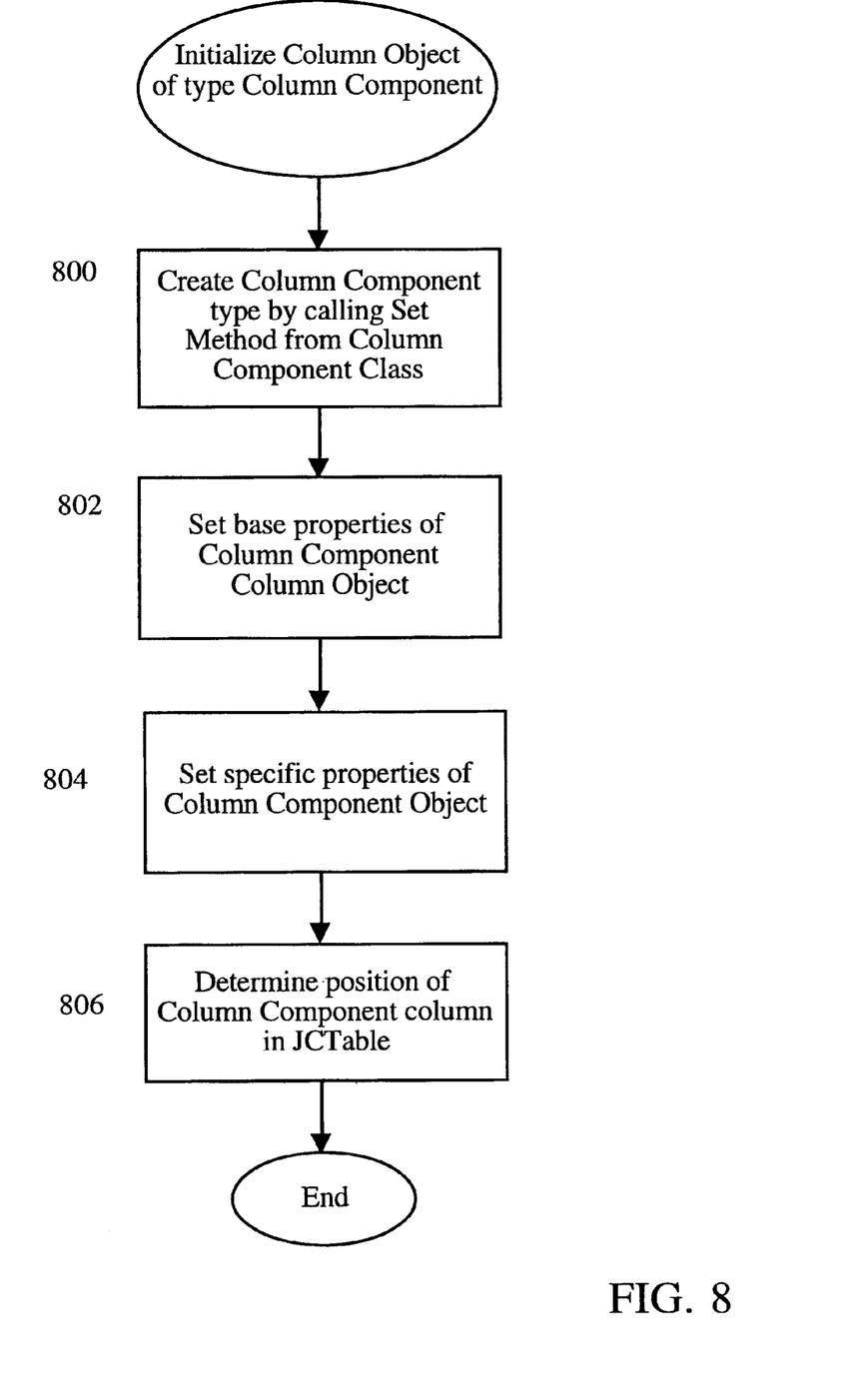
FIG. 8 is a flowchart showing the steps necessary for initializing a column component object.

FIG. 8 is a flowchart showing the steps necessary for initializing a column component object. Recall from FIG. 2B that the column component opens a sub-branch of additional data types (primarily GUI-oriented components). In step 800, the system creates a column component type by calling a set procedure or method from the column component class. The set method is specifically intended for a particular column component type or object. In step 802, specific properties of the column component type are set. These properties include the basic column object properties discussed above with respect to FIG. 3 such as data type, length, visibility, parent object reference, old value, new value and color attributes. In step 804, properties specific to the column component column object are set (the second branch of the tree in FIG. 2B lists many of the column component column objects). For example, in the column choice type, the traverse property of this type may be set to false. In step 806, the system determines and sets the position of the column component object in the underlying JCTable and completes the initialization process for a column component object.

Figure 9:
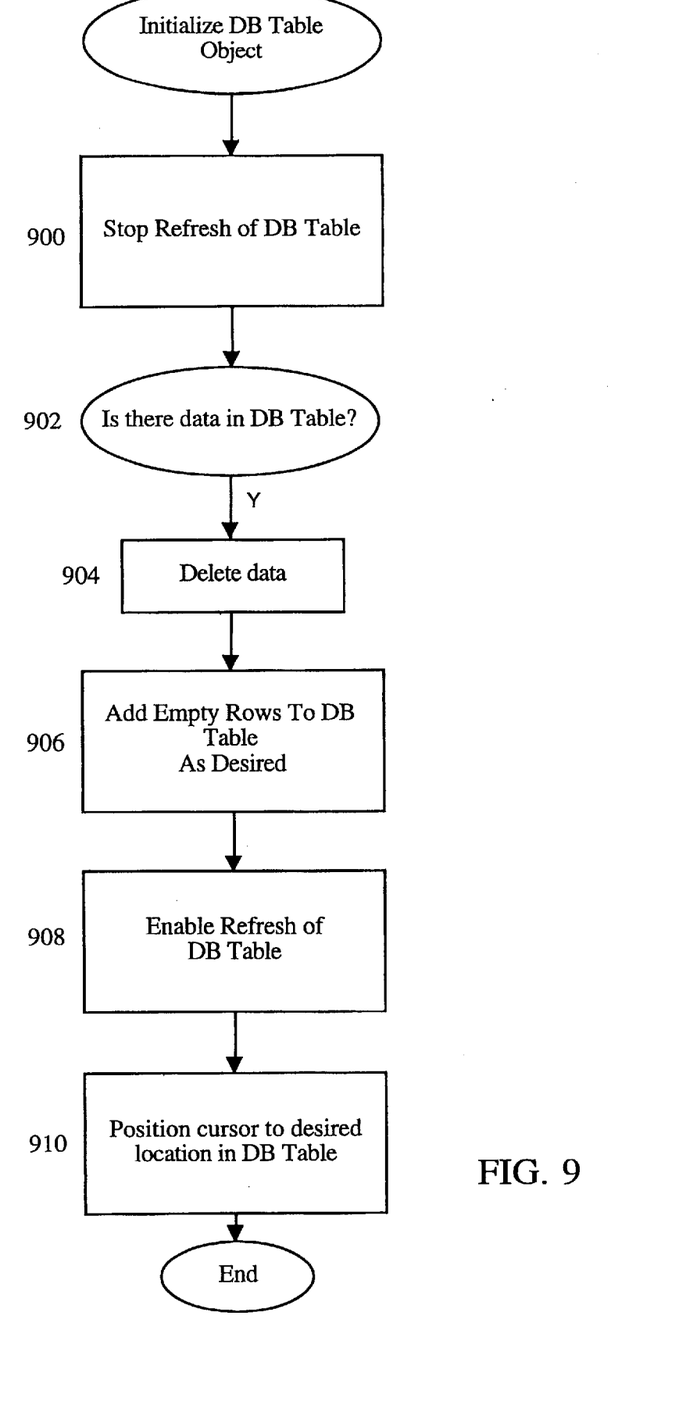
FIG. 9 is a flowchart showing in greater detail step 308 in FIG. 3 describing the steps for initializing the DB table object.

FIG. 9 is a flowchart showing in greater detail step 308 in FIG. 3 describing the steps for initializing the DB table object. In the described embodiment, all changes or updates to the DB table are typically painted or displayed on the screen immediately after they are made. The process of repainting requires significant processing time and slows down the system. In step 900, the system refrains from painting or refreshing the DB table and showing the updates on the display monitor as soon as the updates are made by the user. Thus, in step 900, the system stops the repaint of the DB table with the goal of doing the repaint once the initializing process is complete. In step 902, the system determines whether there are any existing rows or entries in the DB table. If the user desires to empty or clear the table while in the application and start from scratch, calling the initialize method is the easiest way to do this. Typically, there is an option for initializing the table in the host application. The user of the DB table can call the initialized function or method at any time in the application. Thus, it is possible that rows may already exist in the DB table which the system must delete before continuing with the initialization process. If the system determines that there are rows in the DB table, it then deletes these rows in step 904.

If there are no rows in the table, the system continues to step 906. In step 906, the system adds rows to the DB table as set by the application developer. In the described embodiment, the default is to insert one entry or row in the table during initialization. In other preferred embodiments, the table can be initialized to contain any number of rows initially as determined by the application developer. Once the rows are added to the DB table as requested in step 906, the system then enables or continues the painting method in step 908. The number of rows requested in step 906 are then painted or shown to the user on the display monitor in step 908. In step 910, the system places the cursor or pointer in the first cell of the first row in the DB table. In other preferred embodiments, the cursor can be positioned in any of the cells in the DB table. Once the cursor is positioned in the empty DB table, the initialization process is complete.

The present invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should remembered, however, that all of these and similar terms are to be associated with the appropriate physical quantities and are merely convenient labels applied to these quantities.

Further, the manipulations performed are often referred to in terms, such as identifying, running, comparing, or detecting. In any of the operations described herein that form part of the present invention, these operations are machine operations. Useful machines for performing the operations of the present invention include general purpose digital computers or other similar devices. In all cases, it should be borne in mind the distinction between the method of operations in operating a computer and the method of computation itself. The present invention relates to method steps for operating a computer in processing electrical or other physical signals to generate other desired physical signals.

The present invention also relates to a computer system for performing these operations. This computer system may be specially constructed for the required purposes, or it may be a general purpose computer selectively activated or reconfigured by a computer program stored in the computer. The processes presented herein are not inherently related to any particular computer or other computing apparatus. In particular, various general purpose computing machines may be used with programs written in accordance with the teachings herein, or it may be more convenient to construct a more specialized computer apparatus to perform the required method steps.

Figure 10:
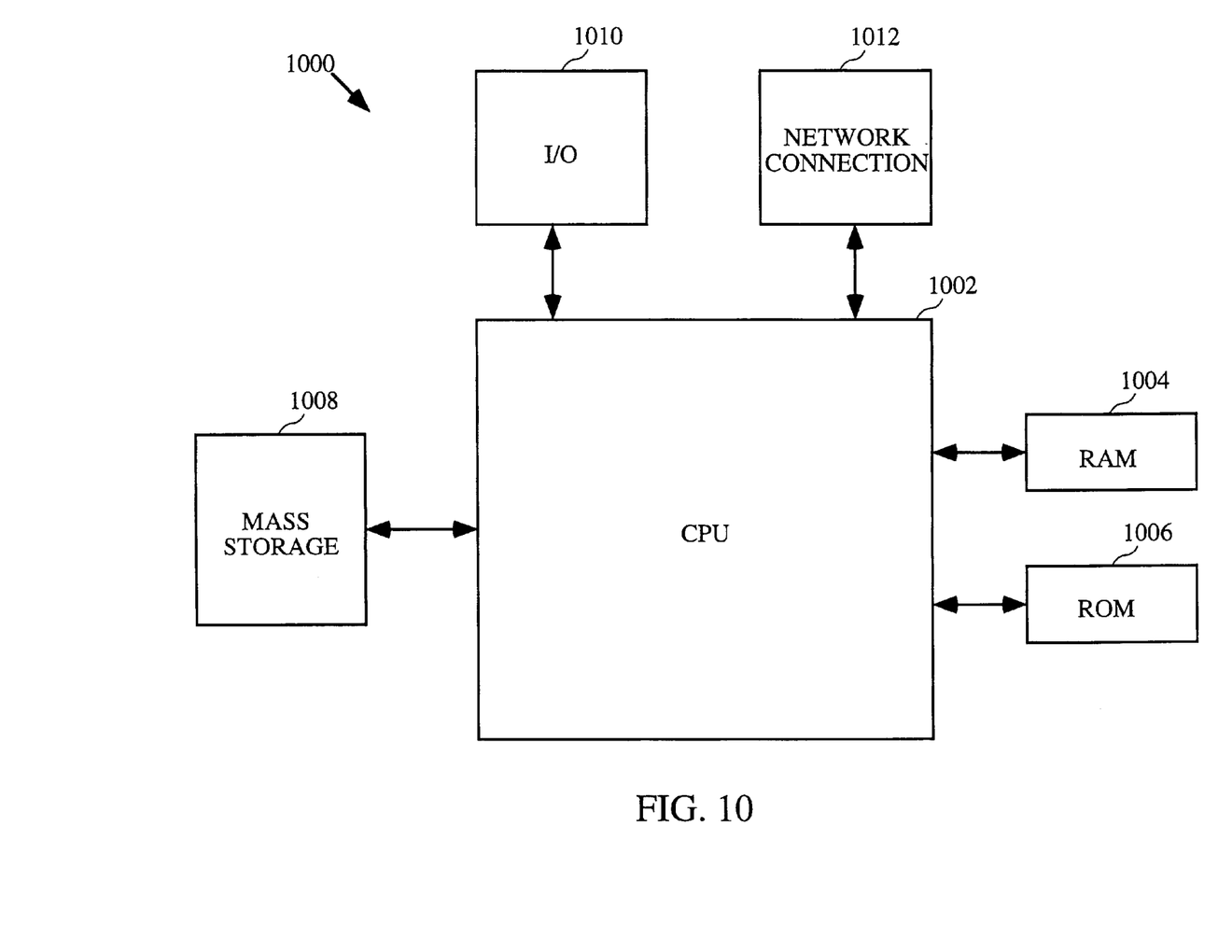
FIG. 10 is a schematic illustration of a general purpose computer system suitable for implementing the present invention.

FIG. 10 is a schematic illustration of a general purpose computer system suitable for implementing the present invention. The computer system includes a central processing unit (CPU) 1002, which CPU is coupled bidirectionally with random access memory (RAM) 1004 and unidirectionally with read only memory (ROM) 1006. Typically RAM 1004 includes programming instructions and data, including text objects as described herein in addition to other data and instructions for processes currently operating on CPU 1002. ROM 1006 typically includes basic operating instructions, data and objects used by the computer to perform its functions. In addition, a mass storage device 1008, such as a hard disk, CD ROM, magneto-optical (floptical) drive, tape drive or the like, is coupled bidirectionally with CPU 1002. Mass storage device 1008 generally includes additional programming instructions, data and text objects that typically are not in active use by the CPU, although the address space may be accessed by the CPU, e.g., for virtual memory or the like. Each of the above described computers further includes an input/output source 1010 that typically includes input media such as a keyboard, pointer devices (e.g., a mouse or stylus) and the like. Each computer can also include a network connection 1012 over which data, including, e.g., text objects, and instructions can be transferred. Additional mass storage devices (not shown) may also be connected to CPU 1002 through network connection 1012. It will be appreciated by those skilled in the art that the above described hardware and software elements are of standard design and construction.

Although only a few embodiments of the present invention have been described, it should be understood that the present invention may be embodied in many other specific forms without departing from the spirit or the scope of the present invention. Thus, the method and system of the present invention, although described in terms used in object-oriented programming environments, are not intended to be limited to an object-oriented programming context. Thus, programming constructs analogous to, for example, methods, objects, and properties, found in more traditional programming languages can be used to implement the present invention. The use of object-oriented programming constructs is not intended to limit the spirit or scope of the present invention. In addition, although the invention has been described in relation to a JCTable, a third-party product, the reusable column classes described can be used in any similar table data structure and search engine. Therefore, the described embodiments should be taken as illustrative and not restrictive, and the invention should be defined by the following claims and their full scope of equivalents.

What is claimed is:

1. A method for creating a table object in a database system, made up of one or more columns, the table object can be used as a programming interface or wrapper for an underlying table component, wherein the table is made up of one or more column objects that can be used on other tables, said column objects holding data of one type, said type being either a basic data type or a specialized graphical user interface type, said table object facilitates the use of said underlying table component, which may contain its own search engine, said method comprising the steps of:

(a) providing a base table comprising of at least one column slot;

(b) creating a table object (c) creating a column object of a desired type wherein the column object has a set of base properties and can be reused with one or more table objects;

(d) associating the column object with the table object to populate the table object thereby creating a populated table object wherein the column object can be indexed to one or more table objects;

(e) assigning the column object to a selected one of the column slots in the base table;

(f) initializing the colun object thereby creating an index between the column object and its assigned column slot in the base table component;

(g) initializing the populated table object thereby setting default values of properties of the column objects.

2. A method as recited in claim 1 further comprising the steps of:

repeating steps (c), (d), (e) and (f) prior to the step of initializing the populated table object, thereby creating a multi-column table object.

3. A method as recited in claim 1 wherein the step of creating a column object of a desired type includes the steps of:

creating an extended portion of the column object wherein the extended portion corresponds to a desired column type, the extended portion including a set of specific properties;

creating a base portion of the column object wherein the base portion is common to all column objects associated with the table object, the base portion including the set of base properties;

setting default values for the base properties of the base portion of the column object; and setting values for the set of specific properties of the extended portion of the column object.

4. A method as recited in claim 3 wherein the desired column types of the column object may include:

a string type, an integer type, a float type, a date, and a graphical user interface component type.

5. A method as recited in claim 4 wherein the graphical user interface component type may include:

a push button type, a choice type, an edit combo box type, a custom choice type, and a combo box type.

6. A method as recited in claim 1 further comprising the step of creating an object table that includes a plurality of records, each record including a column object reference, a column identifier, and a base table index column, thereby identifying a column slot in the base table.

7. A method as recited in claim 1 wherein the step of initializing the column object includes the step of:

customizing the column slot in the base table so that the column object can function in its intended manner in the base table.

8. A method as recited in claim 7 wherein the step of customizing the column slot in the base table includes the steps of:

setting a column length for the column slot in the base table;

adjusting a pixel width of the column slot in the base table according to the setting of a visibility property of the column object; and determining a basic data type of the column object and further customizing the column slot in the base table according to a basic data type if necessary.

9. A method as recited in claim 1 wherein the step of initializing the populated table object includes the steps of:

determining whether the table object contains data;

deleting the data from the table object;

adding blank data to the table object as desired; and terminating temporarily a refresh procedure used to update and display data in the table object and enabling the refresh procedure after adding blank data to the table object.

10. A method as recited in claim 1 wherein the base table is an object-oriented based table.

11. A method as recited in claim 10 wherein the base table is a JCTable component.

* * * * *